Sept. 11, 1934.     R. N. STODDARD     1,973,122
WELDING APPARATUS
Filed April 12, 1932     3 Sheets-Sheet 1
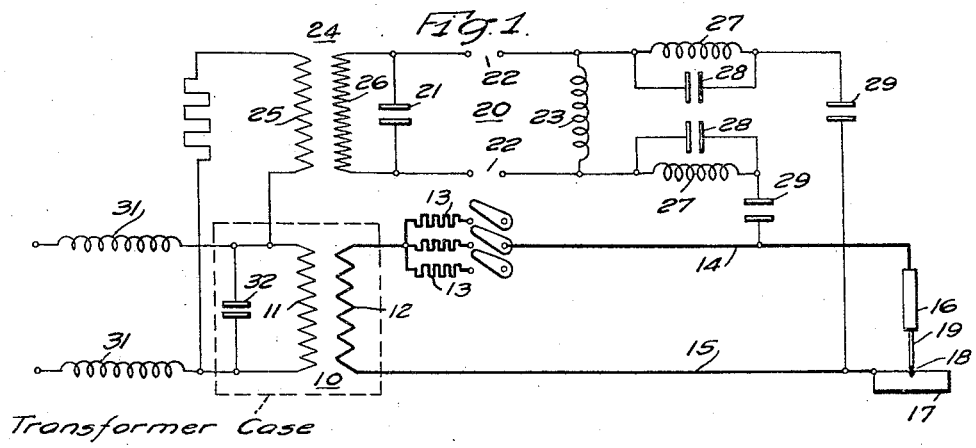
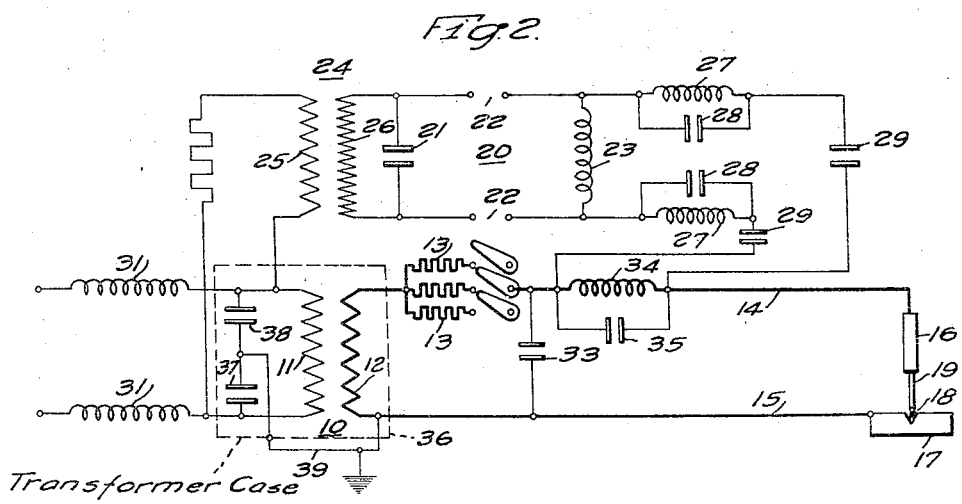

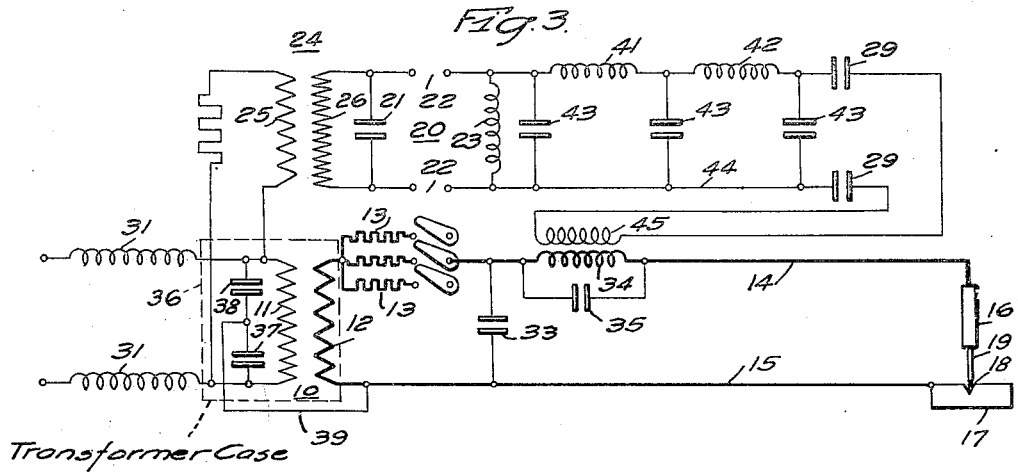
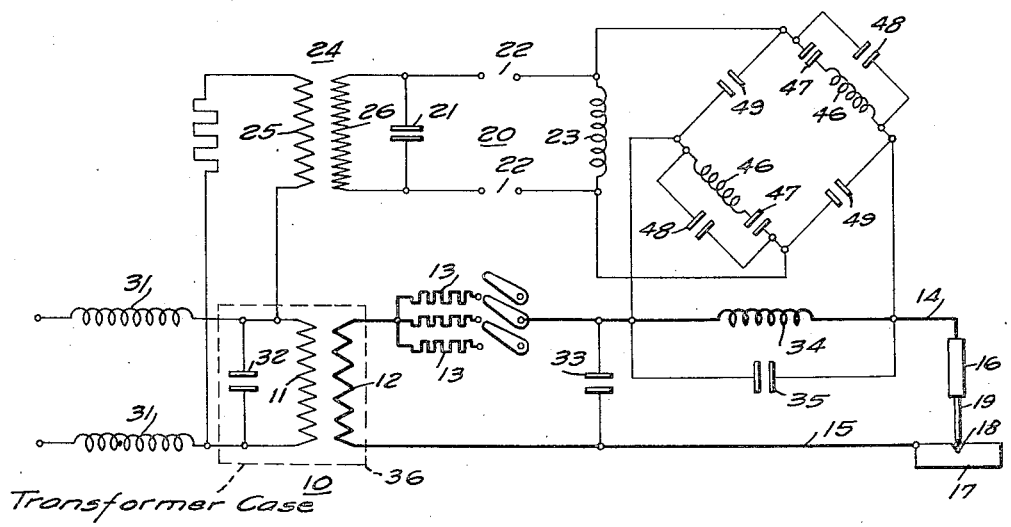

Sept. 11, 1934.    R. N. STODDARD    1,973,122
WELDING APPARATUS
Filed April 12, 1932    3 Sheets-Sheet 3
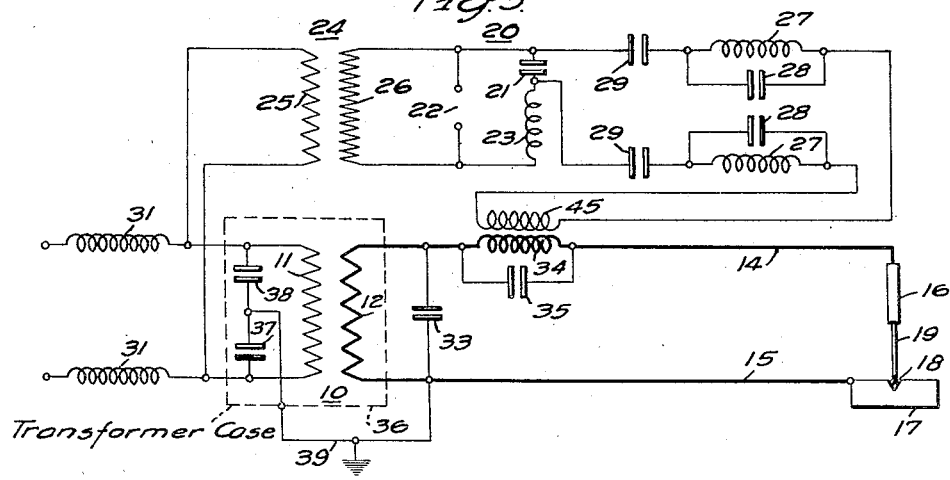
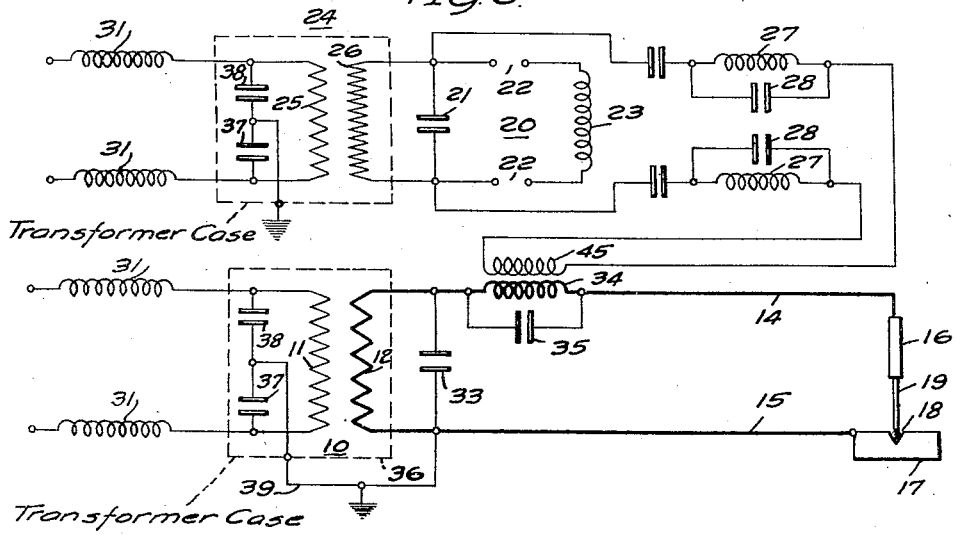
WITNESSES:    INVENTOR
    Ralph N. Stoddard
    BY
    ATTORNEY Patented Sept. 11, 1934

1,973,122

UNITED STATES PATENT OFFICE 1,973,122

WELDING APPARATUS

Ralph N. Stoddard, Pittsburgh, Pa., assignor to Westinghouse Electric & Manufacturing Company, a corporation of Pennsylvania Application April 12, 1932, Serial No. 604,693

31 Claims. (Cl. 219—8)

My invention relates, generally, to welding apparatus and it has particular relation to arc welding apparatus.

When high-frequency oscillatory currents are utilized for stabilizing the operation of a welding arc, it has been found that considerable interference has been caused in connection with the operation of radio receiving sets in the vicinity of the welding apparatus. This difficulty has arisen because of the fact that the welding leads serve in a manner to simulate the function of the antenna of a radio sending station. The high-frequency oscillations are propagated in the form of radio waves and are picked up by radio receiving sets, thereby causing undesirable interference with the reception of any desired programs.

Aside from the direct radiation of the high-frequency oscillatory currents to radio receiving sets, considerable difficulty has also been experienced from interference with radio broadcast reception caused by the coupling between the welding leads and nearby power conductors. It has been found, in many instances, that this coupling is sufficiently great as to cause considerable annoyance to the listeners of radio broadcast programs, when welding apparatus, using high-frequency oscillator currents for stabilizing the operation of the welding arc, is operated in their vicinity.

It has also been found that the high-frequency oscillatory currents are conducted through the welding apparatus to the source of supply, which source may be a power-transmission system supplying current to an area in which many radio receiving sets are in operation. The high-frequency oscillatory currents may be superimposed upon the power system and picked up by the radio receiving sets connected thereto, thereby forming an added annoyance to the reception of radio broadcasting programs.

In order to overcome these difficulties, I propose to use a frequency for stabilizing the welding arc which shall be considerably below the commercial frequencies which are utilized for broadcasting purposes. The system is so arranged that this frequency is transferred from the high-frequency generator to the welding circuit and that frequencies in the broadcast band, which may also be produced by the generator, are excluded from application to the welding circuit.

In addition, suitable means are provided for preventing the arc stabilizing frequency from being transferred into the mains through which power is supplied to the welding apparatus.

Further, it has been found desirable to cause high-frequency arc-stabilizing currents to flow not only to initiate the formation of the welding arc but also to flow after the arc has been formed at the same or at a greater extent. In the prior art, circuits have been used which would produce the maximum arc stabilizing current when the arc resistance was a minimum, as is the case when the arc is completely short circuited or nearly so. In the systems, where the resistance of the arc increased, the arc stabilizing current decreased for the reason that the voltage at which the arc-stabilizing current was applied did not increase at a greater rate than the rate at which the resistance of the arc increased.

I have overcome this difficulty by providing certain resonant circuits between the high frequency generator and the welding circuit which are so chosen as to cause the arc-stabilizing current to increase to a marked extent when the resistance of the arc is increased.

It is therefore, an object of my invention to provide welding apparatus which shall be simple, safe, and efficient in operation and readily and economically manufactured and used.

A more specific object of my invention is to provide for applying high-frequency oscillations at predetermined frequency to a welding circuit for stabilizing the operation of a welding arc.

A further object of my invention is to provide for preventing the arc-stabilizing current from entering the power source.

Still another object of my invention is to provide a welding system in which a minimum amount of power may be used for stabilizing the operation of a welding arc.

Another object of my invention is to provide a welding system in which high-voltage and high-frequency arc-stabilizing current is used that will be innocuous to the welding operator.

Another object of my invention is to superimpose high-frequency stabilizing currents on a welding circuit not only for initiating the arc and preventing its being extinguished but also for supplying stabilizing current when the welding current is at its maximum value.

It is also an object of my invention to provide for increasing the arc stabilizing current when the resistance of the arc is increased.

Other objects of my invention will, in part, be obvious and, in part, appear hereinafter.

My invention, accordingly, is disclosed in the embodiment hereof shown in the accompanying drawings and comprises the features of construction, combination of elements and arrangement of parts which will be exemplified in the construction hereinafter set forth, and the scope of the application of which will be indicated in the appended claims.

For a more specific understanding of the nature and scope of my invention, reference may be had to the following detailed description taken in connection with the accompanying drawings in which:

Figure 1 is a diagrammatic view of an arc welding system constructed in accordance with this invention and having a high-frequency arc-stabilizing circuit connected directly across the welding circuit.

Fig. 2 is a diagrammatic view of an arc welding system embodying a high-frequency arc-stabilizing system, part of which is connected in series-circuit relation with the welding circuit, Fig. 3 is a diagrammatic view of a welding system embodying a high frequency generator, the energy of which is transferred inductively to the welding circuit, Fig. 4 is a modification of the circuit shown in Fig. 2, showing a different filter system connected between the high-frequency generator and the welding circuit, Fig. 5 is a diagrammatic view of a welding system in which high-frequency oscillations are transferred from a high-frequency generator to the welding circuit inductively; the connections to the high-frequency generator being across a condenser of the high-frequency generator; and Fig. 6 is a modification of the circuit shown in Fig. 3, the filtering circuit being somewhat different and the connection to the high-frequency generator being made across the condenser of the high-frequency generator.

Referring to Fig. 1 of the drawings, the apparatus there shown comprises a main transformer 10 provided with a primary winding 11 which may be connected to a suitable source of power, not shown, and a secondary winding 12 which is connected through a plurality of regulating resistors 13 to a welding circuit comprising leads 14 and 15. The welding lead 14 may be connected to a suitable welding electrode holder 16 while the welding lead 15 may be connected to the work 17 on which a welding operation is to be performed. It will be readily understood that a welding arc 18 may be formed and maintained between the work 17 and a welding electrode 19, which is held in the electrode holder 16, when the transformer 10 is connected to the power source.

In order to stabilize the operation of the welding arc, high-frequency oscillations are superimposed thereon, which are generated by means of a high-frequency generator shown generally at 20. The high frequency generator may comprise a condenser 21, a pair of spark gaps 22 and an inductance coil 23 connected in series-circuit relation, as shown in the drawings. The high frequency generator 20 may be energized from an auxiliary transformer 24 which is provided with a primary winding 25 and a secondary winding 26 connected as shown to the condenser 21.

It will be readily understood, however, that any other high-frequency generator may be used, such for example, as a vacuum-tube generator, in place of the spark-gap generator 20 illustrated and described in this specification.

The primary winding 25 of the auxiliary transformer 24 may be connected to the same source of power to which the main transformer 10 is connected. However, it will be readily understood that the auxiliary transformer 24 may be energized from any suitable source, such as may be necessary in the event that the high-frequency oscillating system were used in connection with a direct-current welding system rather than with an alternating-current welding system, as shown in the drawings or for any other reason.

The high-frequency oscillatory currents produced by the generator 20 are transferred to the welding circuit by means of a pair of circuits, each comprising an inductance coil 27, a condenser 28 and a blocking condenser 29. As illustrated in the drawings, these circuits are connected to the opposite terminals of the inductance coil 23 and across the welding circuit. The inductance coil 27 and the condenser 28 form a circuit which is parallel-resonant at a frequency which is approximately in the center of the radio broadcast band of frequencies. It will be readily understood that this parallel-resonance circuit affords a very high impedance to the frequencies of the broadcast band but, that it affords a comparatively low impedance to all other frequencies. Thus, if the generator 20 is so arranged as to produce a fundamental frequency which is considerably below the broadcast band of frequencies, but which generator produces inherently the higher harmonics of this frequency, then the fundamental frequency generated by the generator 20 will be transferred to the welding circuit and all of the higher harmonics thereof, which may be within the broadcast band of frequencies, will be suppressed and, as a result, will be prevented from entering the welding circuit.

While separate condensers 28 are shown in the drawings, it may be found preferable to so construct the inductance coils 27 that their distributed capacity will be such as to obviate the necessity for using the condensers 28. The cost of the apparatus is thereby materially reduced.

In order to prevent the conduction of the high-frequency oscillations to the power source, inductance coils 31 are connected in series-circuit relation with the power mains as shown. In addition, a shunting condenser 32 is connected across the primary winding 11 of the main transformer 10, thereby serving as a shunt path for the high-frequency arc-stabilizing current which may be conducted through the main transformer 10.

It has been found that the system shown in Fig. 1, while capable of serving the desired purpose, still is not sufficiently satisfactory for the reason that the secondary winding 12 of the main transformer 10 and the condenser 32 serve as a shunt path for the high-frequency arc-stabilizing current and, as a result, the voltage which may be applied between the welding electrode 19 and the work 17 is limited to the impedance drop formed by this parallel circuit at times when the welding arc is extinguished.

When the circuit shown in Fig. 1 is used, an appreciable amount of power is necessary in order to provide the desired arc-stabilizing voltage between the welding electrode 19 and the work 17. Further, when the resistance of the welding arc is increased, the amount of stabilizing current flowing through the arc is decreased because the high-frequency arc-stabilizing voltage cannot increase at a rate greater than the rate at which the resistance of the arc increases.

In order to increase the efficiency of the high-frequency generator 20, and further, to provide for obtaining more satisfactory operation, the welding system shown in Fig. 2 is provided.

The welding system shown in Fig. 2 comprises the main transformer 10 for supplying welding current to a welding circuit and the auxiliary transformer 24 for energizing the high-frequency generator 20 as described hereinbefore. In this system, however, a condenser 33 is connected across the welding circuit and is of such capacity as to prevent the flow therethrough of the main welding current but which offers a low impedance path to the high-frequency arc-stabilizing current.

In addition, an impedance coil 34 is connected in series-circuit relation with the welding circuit, as illustrated in the drawings, and has connected in parallel circuit relation therewith a condenser 35. The impedance coil 34 and the condenser 35 form a circuit which is parallel-resonant at the predetermined frequency which it is desired to utilize for stabilizing the operation of the welding arc 18. The impedance coil 35 is preferably constructed of a few turns of fairly large diameter wire, thereby readily permitting the flow of the main welding current therethrough.

In this instance it will be observed that the circuit connecting the generator 20 to the welding circuit is connected across the terminals of the series-connected impedance coil 34 rather than directly across the welding circuit as shown in Fig. 1.

When the circuits between the generator 20 and the welding circuit are considered, it will be apparent that the circuits comprising the impedance coils 27 and the condensers 28 serve to offer a very high impedance to frequencies in the broadcast band for which they are tuned to parallel resonance, while at the same time, they offer a very low impedance path to the predetermined arc-stabilizing frequency. In like manner, it will also be apparent that the condenser 35 offers a very low impedance to the higher harmonics of the predetermined arc-stabilizing frequencies in the broadcast band but that the parallel-resonant circuit, comprising the inductance coil 34 and the condenser 35 offers a very high impedance to the arc-stabilizing frequency. The higher harmonics of the arc-stabilizing frequency will then be suppressed to a very great extent while the high-frequency arc-stabilizing current will be readily permitted to flow through the circuits comprising the impedance coils 27 and the condensers 28.

The condenser 33, as set forth hereinbefore, is so selected as to present a very low impedance path to the arc-stabilizing frequency. The secondary winding 12 of the main transformer 10 is then completely short circuited with respect to the arc-stabilizing frequency and it will be necessary to supply only a very small amount of power at the arc-stabilizing frequency to the circuit comprising the impedance coil 34 and the condenser 35 in order to produce a very high voltage between the work 17 and the electrode 19. It will also be observed that the high voltage generated by the generator 20 is not applied to the secondary winding 12 of the main transformer 10 and, therefore, that it is not necessary to insulate the turns of this winding against any abnormal voltages.

In the welding system shown in Fig. 2, the condensers 29 and 33 are so chosen as to cause the circuit extending from the impedance coil 23 through impedance coil 27 and condenser 28 in parallel, through condenser 29 and conductor 14 to the welding electrode 19 and the arc 18, thence back through the work 17, conductor 15, condensers 33 and 29, impedance coil 27 and condenser 28 in parallel to the impedance coil 23, to be series-resonant at the desired arc-stabilizing frequency at such times when the resistance of the welding arc 18 is very low, as is the case when complete short circuit condition between the welding electrode 18 and the work 17 is approached. It will thus be apparent that under conditions of very low arc resistance, considerable high frequency current will flow because of the series-resonant circuit.

As soon as the resistance of the arc is increased, by increasing the distance between the welding electrode 19 and the work 17, or for any other reason, the parallel-resonant circuit comprising the impedance coil 34 and the condenser 35 will become effective with the result that the flow of high-frequency stabilizing current through the arc will be increased to a marked extent. The flow of arc-stabilizing current is increased for the reason that the high-frequency voltage applied to the welding circuit increases at a greater rate than the arc resistance, because of the presence of the parallel-resonant circuit comprising the impedance coil 34 and the condenser 35. Under certain conditions, the flow of arc-stabilizing current may increase as the resistance of the arc is increased, to as much as six times the current flow which is obtained when the resistance of the arc 18 is substantially equal to zero. It will be observed that this increase of arc-stabilizing current with the increase in arc resistance is an exceedingly valuable characteristic for the purposes set forth in this specification.

The likelihood of the welding operator receiving a severe shock from the low-frequency power, which is supplied through the auxiliary transformer 24, is materially decreased when the circuit shown in Fig. 2 is used, for the reason that the inductance coil 34 forms a very low resistance path to the power frequency of the source to which the auxiliary transformer 24 may be connected.

As a further protection to the operator and to prevent his receiving a shock by touching the transformer case 36 which encloses the apparatus, a pair of condensers 37 and 38 are connected in series-circuit relation and across the primary winding 11. As shown in the drawings, the midpoint between the condensers 37 and 38 is connected by means of a conductor 39 to the transformer case 36 and to the welding lead 15, thereby serving to maintain the transformer case at all times at ground potential.

The system shown diagrammatically in Fig. 3 is similar to that shown in Fig. 2 with certain exceptions. A different type of connecting circuit is used between the high-frequency generator 20 and the welding circuit. This circuit comprises a filter which is generally known as a ladder type of filter, and comprises the inductance coils 41 and 42 connected in series-circuit relation and to the generator 20 at one terminal of the inductance coil 23. A plurality of condensers 43 are connected between the circuit containing the inductance coils 41 and 42 to a conductor 44, as shown. This arrangement of inductance coils 41 and 42 and condensers 43 serves to effectively prevent frequencies in the broadcast band from being transmitted to the welding circuit and super-imposed on the welding current.

In this modification, the arc-stabilizing frequency is inductively transferred to the welding circuit by means of an inductance coil 45 which is disposed in inductive relation with the inductance coil 34 as shown.

Referring now to Fig. 4 of the drawings, the filter circuit connected between the generator 20 and the welding circuit is in the form of a Wheatstone bridge. One pair of opposite legs comprises impedance coils 46 and condensers 47 connected in series-circuit relation and having connected in parallel-circuit relation therewith condensers 48. The remaining pair of opposite legs of the bridge comprises condensers 49.

The impedance coils 46 and the condensers 47 are so chosen that they form a very high impedance to frequencies in the broadcast band as compared to the impedance of condenser 48 at broadcast frequencies. When the relatively low-frequency arc-stabilizing current is applied to the bridge, the impedance coils 46 and the condensers 47 form a comparatively low impedance with respect to the impedance of condensers 48 at the arc-stabilizing frequency. It will then be readily understood that the bridge may be in a substantially balanced condition for frequencies in the broadcast band while it is considerably unbalanced with regard to the arc-stabilizing frequency. As a result, practically all of the higher harmonics of the arc-stabilizing frequency in the broadcast band are suppressed and none of these frequencies are superimposed upon the welding circuit while the remaining frequencies produced by the generator 20 are readily transferred thereto.

In order to decrease the effect of the frequencies other than the one which it is desired to use to stabilize the operation of the welding arc, the circuit shown in Fig. 5 may be used. In this circuit the high-frequency oscillation generator may comprise only one spark gap 22 connected in series-circuit relation with the condenser 21 and the inductance coil 23. As shown in the drawings, the secondary winding 26 of the auxiliary transformer 24 is connected directly across the spark gap 22.

The circuit for transferring high-frequency oscillations from the generator 20 to the welding circuit is connected across the condenser 21 thereby decreasing, to a considerable extent, the effects of the frequencies other than that frequency which it is desired to utilize. The decrease in the effect of the higher frequencies is caused by the fact that the voltage which is available for causing the higher frequencies to flow decreases with increase in frequency due to the inherent characteristic of a capacitative reactance.

The circuit shown in Fig. 6 is similar to that shown in Fig. 5 with the exception that two spark gaps 22 are utilized in the same manner as described in connection with Figs. 1 to 4. The circuit for transferring the high-frequency oscillations from the generator to the welding circuit is connected across the condenser 21 rather than across the inductance coil 23 as described hereinbefore. In addition, connections are shown by means of which the auxiliary transformer 24 may be connected to a source of power separate from the source to which the main transformer 10 is connected.

Since further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. In an arc welding system, in combination, a welding circuit, means for generating high-frequency oscillations, and impedance means for transferring oscillations from said high-frequency generating means at predetermined frequency to the welding circuit to stabilize the operation of the welding arc.

2. In an arc welding system in which welding current is supplied to a pair of welding electrodes from a current source, in combination, means for generating high-frequency oscillations, and reactive means for transferring high-frequency oscillations within a predetermined band from said means to said welding electrodes and preventing the remainder of said frequencies generated by said first-named means from being applied to said electrodes.

3. In an arc welding system, in combination, a welding circuit, a high-frequency oscillation generator, and reactive means connecting the generator and the welding circuit for transferring oscillations at predetermined frequency from the generator to the welding circuit to stabilize the operation of the welding arc.

4. The combination with a source of welding current of a welding circuit connected to the source, reactive circuit means connected in series-circuit relation with said welding circuit to provide a high impedance path for high-frequency oscillations, a high-frequency generator, and additional reactive circuit means connecting said generator to said reactive-circuit means for transferring high-frequency oscillations within a predetermined band from the generator to the welding circuit.

5. The combination with a source of welding current, of a welding circuit connected to the source, a high frequency generator, circuit means connecting the generator to the welding circuit, said connecting means arranged to conduct oscillations of predetermined frequency from the generator to the welding circuit, and means connected in the welding circuit for amplifying the effect of the high-frequency oscillations in the welding circuit.

6. An arc welding system comprising, in combination, a welding circuit, a resonant circuit, comprising an inductance coil and a condenser disposed in parallel-resonant relation at a predetermined frequency, connected in series circuit relation with said welding circuit, means for supplying welding current to the welding circuit from a current source, an oscillation generator for generating oscillations at a plurality of frequencies, and means comprising a plurality of circuits arranged in parallel resonance with respect to a frequency other than said predetermined frequency produced by said oscillation generator for transmitting said predetermined frequency from the generator to said resonant circuit in the welding circuit for stabilizing the operation of the welding arc and preventing said other frequency from entering the welding circuit.

7. In an arc welding system, in combination, a main transformer provided with a secondary winding for supplying current to a welding circuit, an oscillating circuit, an auxiliary transformer provided with a high-voltage secondary winding for energizing the oscillating circuit to generate high-frequency stabilizing currents therein, and reactive means for transferring stabilizing current from the oscillating circuit to the welding circuit at a predetermined frequency.

8. An arc welding system comprising, in combination, a welding circuit, a main transformer provided with a primary winding for connection to a source of low-frequency current and a secondary winding for connection to the welding circuit, an oscillation generator for generating a plurality of high frequencies, an auxiliary transformer provided with a primary winding for connection to a source of low-frequency current and a secondary winding for connection to said generator, and a pair of circuits, connected to the generator and across the welding circuit for transmitting stabilizing current from the generator to the welding arc, each of said circuits comprising a blocking condenser connected in series-circuit relation with a circuit comprising inductance and capacity in parallel-resonant relation within a predetermined band of frequencies and providing a low impedance to another predetermined frequency.

9. In an arc welding system, in combination, a welding circuit, means for generating high-frequency voltage, circuit means connected to said generating means and to said welding circuit for superimposing said high-frequency voltage on the welding circuit to stabilize the operation of the welding arc, said circuit means comprising reactive means disposed to be in series resonance at a predetermined frequency when the resistance of the welding arc is low, and additional reactive circuit means connected in series-circuit relation with said welding circuit and disposed to be in parallel resonance at said predetermined frequency for increasing the high-frequency voltage that is applied to the welding arc at a greater rate than the rate at which the resistance of the arc is increased.

10. In an arc welding system in which welding current is supplied to a welding circuit from a main current source, a high-frequency generator connected to said welding circuit for superimposing high-frequency arc-stabilizing current on the welding circuit, a transformer for supplying energy to said generator from an auxiliary current source, and means connected to said transformer and between the transformer and said auxiliary current source for preventing the high-frequency current produced by said generator from entering said auxiliary current source.

11. An arc welding system comprising, in combination, a welding circuit, means for supplying welding current to the welding circuit from a current source, a generator for generating oscillations at a plurality of high frequencies, said generator comprising a plurality of spark-gaps, an inductance coil and a condenser connected in series circuit relation, a transformer provided with a primary winding for connection to a source of low-frequency current and a secondary high-voltage winding connected across said condenser for energizing the oscillation generator, and means, comprising a pair of circuits arranged in parallel resonance with respect to substantially all but the minimum frequency produced by said oscillation generator, connected to opposite ends of said inductance coil and through a pair of condensers to the welding circuit for transmitting only said minimum frequency from the generator to the welding circuit to stabilize the operation of the welding arc.

12. An arc welding system comprising, in combination, a welding circuit, a main transformer provided with a primary winding for connection to a source of low-frequency current and a secondary winding for connection to the welding circuit, a resonant circuit connected in series-circuit relation with said welding circuit, said resonant circuit characterized by forming a high impedance for a predetermined arc-stabilizing frequency and a low impedance for all other frequencies, an oscillation generator for generating a plurality of frequencies, an auxiliary transformer provided with a primary winding for connection to a source of low-frequency current and a secondary winding for connection to said generator, and circuit means connected to said generator and to said resonant circuit for transmitting arc-stabilizing current from the generator to the welding circuit, said circuit means characterized by providing a low impedance to said predetermined frequency and a high impedance to a predetermined band of other frequencies.

13. An arc welding system comprising, in combination, a welding circuit, a main transformer provided with a primary winding for connection to a source of low-frequency current and a secondary winding for connection to the welding circuit, a resonant circuit connected in series-circuit relation with said welding circuit, said resonant circuit characterized by forming a high impedance for a predetermined arc-stabilizing frequency and a low impedance for all other frequencies, an oscillation generator for generating a plurality of frequencies, an auxiliary transformer provided with a primary winding for connection to a source of low-frequency current and a secondary winding for connection to said generator, circuit means connected to said generator and to said resonant circuit for transmitting arc-stabilizing current from the generator to the welding circuit, said circuit means characterized by providing a low-impedance to said predetermined frequency and a high impedance to a predetermined band of other frequencies, and a condenser connected across said welding circuit and between said resonant circuit and the secondary winding of said main transformer to provide a low impedance path for said predetermined arc stabilizing frequency.

14. An arc welding system comprising, in combination, a welding circuit, a main transformer provided with a primary winding for connection to a source of low-frequency current and a secondary winding for connection to the welding circuit, a resonant circuit connected in series-circuit relation with said welding circuit, said resonant circuit characterized by forming a high impedance for a predetermined arc-stabilizing frequency and a low impedance for all other frequencies, an oscillation generator for generating a plurality of high frequencies, an auxiliary transformer provided with a primary winding for connection to a source of low-frequency current and a secondary winding for connection to said generator, and circuit means connected to said generator and inductively connected to said resonant circuit for transmitting arc-stabilizing current from the generator to the welding circuit, said circuit means characterized by providing a low impedance to said predetermined frequency and a high impedance to a predetermined band of other frequencies.

15. An arc welding system comprising, in combination, a welding circuit, a main transformer provided with a primary winding for connection to a source of low-frequency current and a secondary winding for connection to the welding circuit, a resonant circuit connected in series-circuit relation with said welding circuit, said resonant circuit characterized by forming a high impedance for a predetermined arc-stabilizing frequency and a low impedance for all other frequencies, an oscillation generator for generating a plurality of high frequencies, an auxiliary transformer provided with a primary winding for connection to a source of low-frequency current and a secondary winding for connection to said generator, and a filter circuit connected to said generator and to said resonant circuit for transmitting arc-stabilizing current from the generator to the welding circuit, said filter circuit comprising a pair of circuits in parallel resonance at a predetermined band of frequencies and forming opposite sides of a Wheatstone bridge, and a pair of condensers forming the remaining opposite sides of the Wheatstone bridge and providing a low impedance path for said arc-stabilizing frequency and a high impedance for said predetermined band of frequencies.

16. An arc welding system comprising, in combination, a main transformer for supplying current to a welding circuit from a current source, means connected to the welding circuit for supplying high-frequency current for stabilizing the operation of the welding arc, circuit means connected to the main transformer and between the main transformer and the current source for preventing said high-frequency current from entering the current source, and a circuit connecting said circuit means and the welding circuit.

17. An arc welding system comprising, in combination, a main transformer provided with a case for supplying current from a current source to a welding circuit comprising a pair of welding leads, means connected to one of said leads for supplying high-frequency current for stabilizing the operation of the welding arc, circuit means connected to the main transformer and between the main transformer and the current source for preventing said high-frequency current from entering the current source, and means connecting said circuit means to said transformer case and to the other of said welding leads.

18. An arc welding system comprising, in combination, a main transformer provided with a primary winding for connection to a source of current and a secondary winding for connection to a welding circuit, means for supplying high-frequency current for stabilizing the operation of the welding arc, a plurality of condensers connected in series-circuit relation and to said primary winding for preventing said high-frequency current from entering the current source, and a connection between the welding circuit and said condensers at a point along the condensers having a potential less than the full potential applied to said primary winding.

19. In an arc welding system in which welding current is supplied from a current source to a welding circuit, means for supplying high-frequency current to the welding circuit for stabilizing the operation of the arc comprising, in combination, a transformer provided with a primary winding for connection to a current source and a secondary winding for connection to a spark gap of an oscillator circuit, said oscillator circuit comprising the spark gap, a condenser and an inductance coil connected in series-circuit relation, and a circuit comprising a plurality of inductive means connected to said condenser and inductively related to said welding circuit for transferring oscillations of predetermined frequency from said oscillating circuit to the welding circuit.

20. In an arc welding system in which welding current is supplied from a current source to a welding circuit, means for supplying high-frequency current to the welding circuit for stabilizing the operation of the arc comprising, in combination, a transformer provided with a primary winding for connection to a current source and a secondary winding for connection to a condenser of an oscillator circuit, said oscillator circuit comprising the condenser, a plurality of spark gaps and an inductance coil connected in series-circuit relation, and a circuit comprising a plurality of inductive means connected to said secondary winding and to said welding circuit for transferring oscillations of predetermined frequency from said oscillating circuit to the welding circuit.

21. An arc welding system comprising, in combination, a welding circuit, means for supplying welding current from a current source to the welding circuit, means for generating high-frequency oscillations, reactive means for transferring oscillations from said high-frequency generating means at predetermined frequency to the welding circuit to stabilize the operation of the welding arc, and means for preventing the high-frequency oscillations from entering the current source.

22. An arc welding system comprising, in combination, a welding circuit, means for supplying welding current from a current source to the welding circuit, a high-frequency oscillation generator, reactive means connecting the generator and the welding circuit, said connecting means arranged to conduct oscillations of predetermined frequency from the generator to the welding circuit for stabilizing the operation of the welding arc, and means for preventing the high-frequency oscillations from entering the current source.

23. The combination with a source of welding current, of a welding circuit connected to the source, a high-frequency generator, circuit means connecting the generator to the welding circuit, said connecting means arranged to conduct oscillations of predetermined frequency from the generator to the welding circuit, means connected in the welding circuit for amplifying the effect of the high-frequency oscillations in the welding circuit, and means for preventing the high-frequency oscillations from entering the current source 24. An arc welding system comprising, in combination, a welding circuit, a resonant circuit, comprising an inductance coil and a condenser disposed in parallel-resonant relation at a predetermined frequency, connected in series-circuit relation with said welding circuit, means for supplying welding current to the welding circuit from a current source, an oscillation generator for generating oscillations at a plurality of high frequencies, means comprising a plurality of circuits arranged in parallel resonance with respect to substantially all frequencies but said predetermined frequency produced by said oscillation generator, for transmitting only said predetermined frequency from the generator to said resonant circuit in the welding circuit for stabilizing the operation of the welding arc, and means for preventing high-frequency oscillations from entering the current source.

25. An arc welding system comprising, in combination, a welding circuit, a main transformer provided with a primary winding for connection to a source of low-frequency current and a secondary winding for connection to the welding circuit, a resonant circuit connected in series-circuit relation with said welding circuit, said resonant circuit characterized by forming a high impedance for a predetermined arc-stabilizing frequency and a low impedance for all other frequencies, an oscillation generator for generating a plurality of high frequencies, an auxiliary transformer provided with a primary winding for connection to a source of low-frequency current and a secondary winding for connection to said generator, circuit means connected to said generator and to said resonant circuit for transmitting arc-stabilizing current from the generator to the welding circuit, said circuit means characterized by providing a low impedance to said predetermined frequency and a high impedance to a predetermined band of other frequencies, and means for preventing high-frequency oscillations from entering said current source.

26. An arc welding system comprising, in combination, a welding circuit, a circuit in parallel resonance at a predetermined high frequency, connected in series-circuit relation with said welding circuit, an oscillation generator for generating oscillations at a plurality of high frequencies including said predetermined high frequency, a filter circuit connected to said generator and characterized by transferring therefrom only said predetermined high frequency, and means connected to said filter circuit and disposed inductively with respect to said resonant circuit for superposing said predetermined frequency on the welding circuit to stabilize the operation of the welding arc.

27. An arc welding system comprising, in combination, a welding circuit, a main transformer provided with a primary winding for connection to a source of low-frequency current and a secondary winding for connection to the welding circuit, an oscillation generator for generating a plurality of high frequencies, an auxiliary transformer provided with a primary winding for connection to a source of low-frequency current and a secondary winding for connection to said generator, a pair of circuits connected to the generator and across the welding circuit for transmitting stabilizing current from the generator to the welding arc, each of said circuits comprising a blocking condenser connected in series-circuit relation with a circuit comprising inductance and capacity in parallel-resonant relation within a predetermined band of frequencies and providing a low impedance to another predetermined frequency, and means for preventing high-frequency oscillations from entering said current source.

28. In an arc welding system, in combination, a welding circuit, means for generating high-frequency current, and circuit means connected to said generating means and to said welding circuit for superimposing said high-frequency current on the welding circuit to stabilize the operation of the welding arc, said circuit means characterized by causing the amount of arc-stabilizing current supplied to the welding arc to increase when the arc resistance is increased.

29. In an arc welding system in which welding current is supplied from a current source to a welding circuit, means for supplying high-frequency current to the welding circuit for stabilizing the operation of the arc comprising, in combination, a high-frequency generator, a condenser in the circuit of the generator, a resonant circuit, comprising an inductance coil and a condenser disposed in parallel-resonant relation at a predetermined frequency, connected in series circuit relation with the welding circuit, and circuit means connecting said condenser of the generator in shunt circuit relation to said resonant circuit.

30. The method of arc welding which comprises maintaining a low-frequency welding arc between a welding electrode and work on which a welding operation is to be performed, superimposing high-frequency oscillations on the welding arc for stabilizing the operation thereof, and automatically increasing the stabilizing effect of the high-frequency oscillations as the low-frequency arc tends to become extinguished.

31. The method of arc welding which comprises maintaining a welding arc from a main current source, applying high-frequency oscillations to the arc from an auxiliary current source, and automatically increasing the intensity of the high-frequency oscillations as the resistance of the arc is increased.

RALPH N. STODDARD.